(12) United States Patent
Sakai et al.

(10) Patent No.: US 8,770,871 B2
(45) Date of Patent: Jul. 8, 2014

(54) IMAGE PROCESSING DEVICE, PRINTING DEVICE, AND MEDIUM HAVING RECORDED IMAGE PROCESSING PROGRAM

(75) Inventors: Hirofumi Sakai, Shiojiri (JP); Mitsuhiro Yamashita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 105 days.

(21) Appl. No.: 13/449,558

(22) Filed: Apr. 18, 2012

(65) Prior Publication Data

US 2012/0263512 A1    Oct. 18, 2012

(30) Foreign Application Priority Data

Apr. 18, 2011   (JP) ................................. 2011-091655

(51) Int. Cl.
*B41J 11/44* (2006.01)
*H04N 1/54* (2006.01)

(52) U.S. Cl.
CPC ...................................... *H04N 1/54* (2013.01)
USPC .............................................. 400/76; 400/62

(58) Field of Classification Search
CPC ....................................................... H04N 1/54
USPC ........................................................... 400/76
See application file for complete search history.

(56) References Cited

U.S. PATENT DOCUMENTS

| | | | |
|---|---|---|---|
| 5,489,997 A * | 2/1996 | Usami ............................ 358/522 |
| 5,683,188 A * | 11/1997 | Miyazaki et al. .............. 400/279 |
| 6,084,610 A * | 7/2000 | Ozaki et al. ...................... 347/43 |
| 6,805,422 B2 * | 10/2004 | Takahashi et al. ............... 347/15 |
| 7,084,610 B2 | 8/2006 | Chen |
| 7,252,356 B2 * | 8/2007 | Ide et al. ........................... 347/12 |
| 7,322,687 B2 * | 1/2008 | Tomotake et al. ............. 347/100 |
| 7,408,675 B2 * | 8/2008 | Ono ................................ 358/1.9 |
| 7,630,540 B2 * | 12/2009 | Nobushima .................... 382/162 |
| 7,859,723 B2 * | 12/2010 | Yamada et al. ............... 358/3.05 |
| 8,091,977 B2 * | 1/2012 | Masuyama ...................... 347/15 |
| 2002/0021317 A1 * | 2/2002 | Chikuma et al. ................. 347/12 |
| 2007/0188547 A1 | 8/2007 | Kobayashi et al. |
| 2010/0177131 A1 | 7/2010 | Yoshida |
| 2010/0207987 A1 | 8/2010 | Sano |

FOREIGN PATENT DOCUMENTS

| | | |
|---|---|---|
| JP | 08-216393 A | 8/1996 |
| JP | 2006-182028 A | 7/2006 |
| JP | 2007-050555 A | 3/2007 |
| JP | 2010-158888 A | 7/2010 |
| JP | 2010-166152 A | 7/2010 |

* cited by examiner

*Primary Examiner* — Anthony Nguyen
(74) *Attorney, Agent, or Firm* — Global IP Counselors, LLP

(57) ABSTRACT

To provide a technique for outputting printing image data to a printing device using a colored ink, and a special glossy ink having special gloss, including a field discrimination part for discriminating whether there is an adjacent field, in which a special glossy field that is expressed using the special glossy ink and a color production field that is expressed using the colored ink are adjacent in the direction of the image plane; a special gloss boundary processor for adjusting the image data so that the ink volume of the special glossy ink affixed to the special glossy field is gradually reduced from the special glossy field towards the color production field in a case where an adjacent field is present; and an output part for outputting the printing image data based on the adjusted image data the printing device.

9 Claims, 10 Drawing Sheets

IMAGE PROCESSING DEVICE, PRINTING DEVICE, AND MEDIUM HAVING RECORDED IMAGE PROCESSING PROGRAM

CROSS-REFERENCE TO RELATED APPLICATIONS

This application claims priority to Japanese Patent Application No. 2011-091655 filed on Apr. 18, 2011. The entire disclosure of Japanese Patent Application No. 2011-091655 is hereby incorporated herein by reference.

BACKGROUND

1. Technical Field

The present invention relates to an image processing device and specifically relates to an image processing device and an associated printing technique whereby printing image data for printing is output to a printing device for carrying out printing using colored ink and a special glossy ink.

2. Background Technology

Techniques are known in which printing is carried out using an ink having special gloss that is not involved in standard color printing, such as metallic ink having a metallic gloss, white ink, or pearlescent white ink (also referred to below as "special glossy ink;" refer, for example to patent document 1). These printing techniques can print fields for forming an image using only colored ink (also referred to as "color producing field" below) and fields for forming an image using the special glossy ink (also referred to as "special glossy field" below) on a single printing substrate. However, when the color producing field and the special glossy field are formed adjacently on the printing substrate, problems have been noted concerning flowing and exudation (also referred to as "bleeding" below) of the special glossy ink for forming the special glossy field into the color producing field, due to differences in surface tension, polarity, or the like between the metallic ink and the colored ink.

Japanese Laid-open Patent Publication No. 2010-166152 (Patent Document 1) is an example of the related art.

SUMMARY

In light of the above problems, the problems that are to be resolved by the invention are to inhibit bleeding in printed images in which a color production field and a special glossy field are adjacent.

The invention is developed in order to resolve at least some of the problems described above and can be worked as described in the configurations and application examples presented below.

Application Example 1

An image processing device for outputting printing image data for printing to a printing device for carrying out printing using a colored ink, and a special glossy ink having special gloss, the image processing device further including:

an input part for inputting image data of an image to be printed;

a field discrimination part for discriminating, based on the image data, whether there is an adjacent field, in which a special glossy field that is expressed using the special glossy ink and a color production field that is expressed using the colored ink are adjacent in the direction of the image plane;

a special gloss boundary processor for adjusting the image data so that the ink volume of the special glossy ink affixed to the special glossy field is gradually reduced from the special glossy field towards the color production field in a case where an adjacent field is present;

and an output part for outputting the printing image data based on the adjusted image data to the printing device.

With this image processing device, by carrying out printing using the printing device, printing image data can be output that inhibits exudation (bleeding) due to flow of the special glossy ink into the color production field at the boundary of the special glossy field and the color production field.

Application Example 2

The image processing device of Application Example 1, wherein the special gloss boundary processor, by adjusting the input image data, does not change the ink volume of the colored ink that is affixed by the printing device based on the printing image data. According to this image processing device, the ink volume of colored ink is not changed by the adjusting, and so degradation of the image can be prevented.

Application Example 3

The image processing device according to application example 1 or 2, wherein the special gloss boundary processor sets, within a predetermined range, the rate of decrease in the gradually decreasing special glossy ink.

According to this image processing device, the rate of decrease in the gradually decreasing special glossy ink can be variably set in accordance with characteristics of the image to be printed and the preference of the user.

Application Example 4

The image processing device according to Application Example 3, which has a color patch output part for printing, to the printing device, a color patch that associates, for predetermined image data having the adjacent field, a plurality of the rates of decrease with images of individual adjacent fields based on the adjusted respective image data sets at each of the rates of decrease.

According to this image processing device, the user can select from a plurality of rates of decrease while visually checking a color patch that was actually printed by the printing device.

Application Example 5

The printing processing device according to any of application examples 1 to 4, wherein the special glossy ink is a metallic ink having metallic gloss.

The invention can be worked in various modes. For example, the invention can be worked in modes such as a printing processing device, an image processing method, and an image processing program, as well as in image processing modules, printer drivers, raster image processors (also referred to as "RIPs" below), and the like. Specific examples are presented below.

Application Example 6

A printing device whereby printing is carried out using a colored ink and a special glossy ink having special gloss, the printing device further including:

an input part for inputting image data representing an image to be printed;

a field discrimination part for discriminating, based on the image data, whether there is an adjacent field, in which a special glossy field that is expressed using the special glossy ink and a color production field that is expressed using the colored ink are adjacent in the direction of the image plane;

a special gloss boundary processor for adjusting the image data so that the ink volume of the special glossy ink affixed to the special glossy field is gradually reduced from the special glossy field towards the color production field in a case where an adjacent field is present;

and a printing part for executing printing based on the adjusted image data.

Application Example 7

An image processing method for outputting printing image data for printing to a printing device for carrying out printing using a colored ink and a special glossy ink having special gloss, the image processing method further including inputting for inputting image data representing an image to be printed; discriminating, based on the image data, whether there is adjacent field, in which a special glossy field that is expressed using the special glossy ink and a color production field that is expressed using the colored ink are adjacent in the direction of the image plane; adjusting the image data so that the ink volume of the special glossy ink affixed to the special glossy field is gradually reduced from the special glossy field towards the color production field in a case where an adjacent field is present; and outputting the printing image data based on the adjusted image data to the printing device.

Application Example 8

An image processing program for outputting printing image data for printing to a printing device for carrying out printing using a colored ink and a special glossy ink having special gloss, where this image processing program causes a computer to execute: a function for inputting image data representing the image to be printed; a function for discriminating, based on the image data, whether there is an adjacent field, in which a special glossy field that is expressed using the special glossy ink and a color production field that is expressed using the colored ink are adjacent in the direction of the image plane; a function for adjusting the image data so that the ink volume of the special glossy ink affixed to the special glossy field is gradually reduced from the special glossy field towards the color production field in a case where an adjacent field is present; and a function for outputting the printing image data based on the adjusted image data to the printing device.

BRIEF DESCRIPTION OF THE DRAWINGS

Referring now to the attached drawings which form a part of this original disclosure.

DETAILED DESCRIPTION OF EXEMPLARY EMBODIMENTS

Embodiments of the invention are described below based on examples.

A. Example 1

(A1) System Configuration

Figure 1:
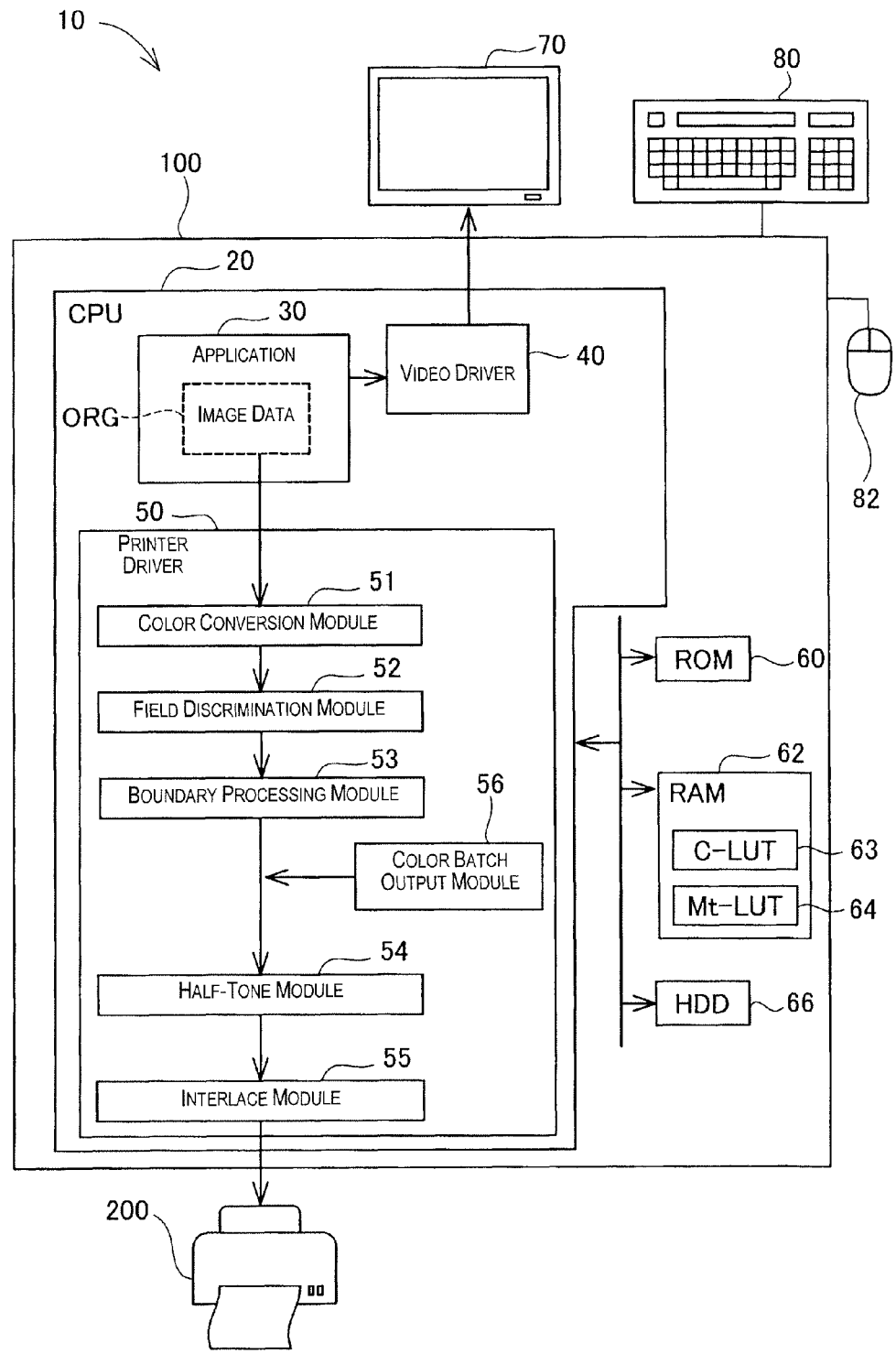
FIG. 1 is a descriptive diagram for illustrating the schematic configuration of the printing system 10.

FIG. 1 is a descriptive diagram for illustrating the schematic configuration of the printing system 10 in Example 1 of the invention. The printing system 10 includes a computer 100 used as a printing control device, and a printer 200 for printing an actual image under control of the computer 100. The printing system 10, taken as an integral whole, functions as a printing device broadly defined.

The computer 100 includes a CPU 20, a ROM 60, a RAM 62, and a hard disk (HDD) 66. In addition, the computer 100 is connected by respective cables to a display 70, a keyboard 80, and a mouse 82. A predetermined operating system is installed on the computer 100, and an application program 30, a video driver 40, and a printer driver 50 operate based on this operating system. The functions of these programs are stored in the ROM 60, RAM 62, or HDD 66, and each function is executed when the CPU 20 reads and executes each of the programs from their storage regions.

The application program 30 is a program whereby a user can produce images. The image data of the images that have been generated by the application program 30 (also referred to as "images to be printed" below) is referred to as image data ORG. The image data ORG has a field that is expressed by a combination of primary colors (also referred to as "color production field" below), and a field that is expressed using metallic gloss (also referred to as "metallic field" below). The user can designate an arbitrary field of the produced image as a metallic field on the application program 30.

When the user generates an image to be printed using the application program 30, the color component values in the data of the respective pixels in the image data ORG (also referred to as "pixel data" below) are recorded using a red (R), green (G), blue (B) color system. In addition, for the various pixel data of the image data ORG, a predetermined bit number is set for the channel that represents pixels that belong to a color production field or pixels that belong to a metallic field (also referred to as "a-channel" below).

The printer driver 50 includes a color exchange module 51, a field discrimination module 52, a boundary processing module 53, a half-tone module 54, an interlace module 55, and a color patch module 56. These modules are run by being read from the HDD 66 to the RAM 62 when the CPU 20 starts up the program of the printer driver 50. Details concerning each module are described below.

The RAM 62 includes a color production field lookup table 63 (also referred to as "C-LUT 63" below), a metallic field lookup table 64 (also referred to as "Mt-LUT 64" below). Details concerning these lookup tables are presented below.

Figure 2:
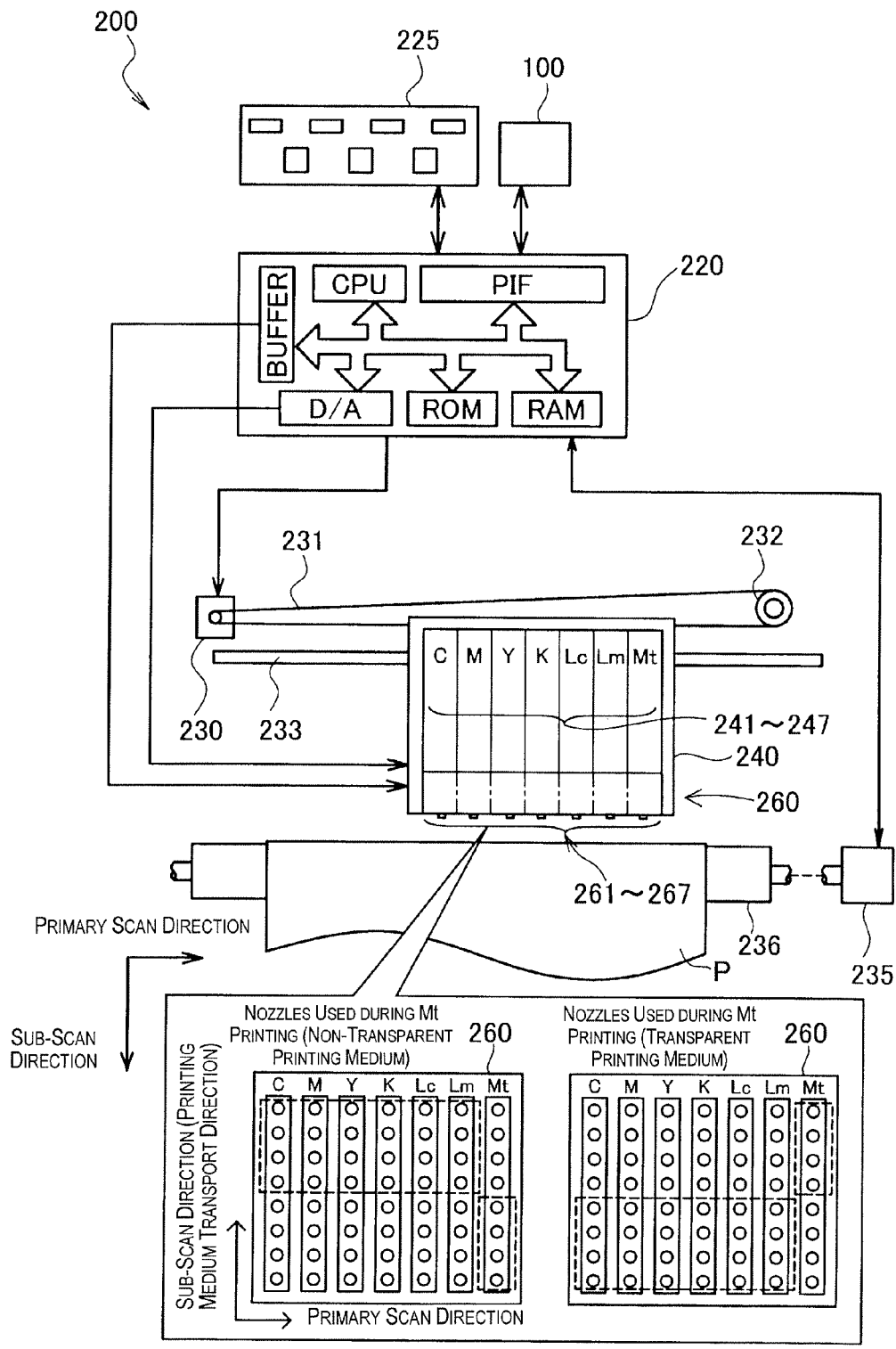
FIG. 2 is a diagram showing the schematic configuration of the printer 200.

FIG. 2 is a configuration diagram of the printer 200. As shown in FIG. 2, the printer 200 includes a mechanism for transporting a printing medium P by a paper feed motor 235, a mechanism for recursive movement of a carriage 240 in the axial direction of the platen 236 by a carriage motor 230, a mechanism for outputting inks and forming dots by driving a printing head 260 that is mounted on the carriage 240, and a control circuit 220 that can send and receive signals with respect to the paper feed motor 235, the carriage motor 230, the printing head 260, and an operating panel 225.

The mechanism for recursively moving the carriage 240 in the axial direction of the platen 236 includes a sliding shaft 233 that is erected parallel to the axis of the platen 236 and slidably supports the carriage 240, and a pulley 232 on which an endless drive belt 231 is suspended between the pulley and the carriage motor 230.

On the carriage 240 are mounted ink cartridges 241 to 247 that respectively contain inks of a total of seven colors: C (cyan), M (magenta), Y (yellow), K (black) Lc (light cyan), Lm (light magenta), as well as metallic ink having metallic gloss (also referred to as "Mt" below). Seven types of nozzle rows 261 to 267 corresponding to the inks of each color described above are provided on the printing head 260 in the lower part of the carriage 240. A piezo element is provided for each of the nozzles, and the printer 200 forms dots for each ink color when the control circuit 220 controls contraction operations of the piezo elements.

Ink cartridges 241 to 247 are installed on the carriage 240 from above, and ink can be supplied from each cartridge to each nozzle row 261 to 267. In this example, the ink cartridges 241 to 247, as shown in FIG. 2, are arranged in the sequence C, M, Y, K, Lc, Lm, Mt in the primary scan direction of the carriage 240.

With the printer 200, non-transparent printing media and transparent printing media can be selected and used as the printing medium P. For example, ordinary white paper or colored printing media having predetermined colors can be used as the non-transparent printing medium. For example, transparent or semitransparent film can be used as the transparent printing medium.

In addition to the colored inks (C, M, Y, K, Lc, Lm), a metallic ink (Mt) is used in conjunction in order to carry out printing (also referred to as "Mt" printing below). In such a case, when printing is to be carried out using a non-transparent printing medium, as shown on the lower left in FIG. 2, printing is carried out using the rear half, in the sub-scan direction, of the respective nozzle rows 261 to 266 for discharging colored ink and the front half, in the sub-scan direction, of the nozzle row 267 for discharging metallic ink. By using the respective nozzle rows in this manner, dots of metallic ink (Mt) are formed first on the printing medium P, and dots of the colored ink are then formed thereupon, allowing metallic gloss of various color shades to be manifested in the printed image.

On the other hand, when Mt printing is to be carried out, if printing is to be carried out using a transparent printing medium, then printing is carried out using the front half in the sub-scan direction of the nozzle rows 261 to 266 for discharging colored ink and the rear half in the sub-scan direction of the nozzle row 267 for discharging metallic ink, as shown in the bottom right of FIG. 2. By using the nozzle rows in this manner, dots of colored ink are first formed on the printing medium P, and dots of the metallic ink (Mt) are then formed thereupon. As a result, it is possible to express metal gloss with various shades of color when the surface for viewing the printed image is the surface of the printing medium that is on the side that is opposite from the surface on which the ink dots are formed.

The control circuit 220 of the printer 200 has a configuration in which a CPU, ROM, RAM, PIF (peripheral device interface) and the like are interconnected by a bus, and control of primary scanning and sub-scanning operations of the carriage 240 is carried out by controlling operation of the carriage motor 230 and the paper feed motor 235. In addition, when the printing data that has been output by the computer 100 is acquired via the PIF, the control circuit 220 supplies a drive signal in accordance with the printing data to the printing head 260 in association with primary scanning and sub-scanning movement made by the carriage 240, thereby driving the head for each color. The printing data that is output by the computer 100 includes data concerning color, specifically, data concerning the seven ink colors (C, M, Y, K, Lc, Lm, Mt). The printer 200 acquires printing data that includes this data concerning the seven ink colors.

The printer 200 having the type of hardware configuration described above drives the carriage motor 230, thereby causing recursive movement of the printing head 260 (nozzle rows 261 to 267) in the primary scan direction with respect to the printing medium P and also drives the paper feed motor 235, thereby causing movement of the printing medium P in the sub-scan direction. The control circuit 220 drives the nozzles with appropriate timing based on the printing data in association with recursive movement of the carriage 240 (primary scanning) and paper feeding of the printing medium (sub-scanning), thereby forming ink dots of the appropriate colors in the appropriate locations on the printing medium P. In this manner, the printer 200 can print an image on the recording medium P. In the configuration described above, the inks of various colors are housed in a cartridge that is removably mounted on the printer 200, but the inks can also be housed in ink housing tanks that are configured separate from the printer 200, where the housing tanks and the printer 200 are connected by tubes or the like for supplying ink. Alternatively, the inks can be housed in housing containers that are integrally configured with the printer 200 and cannot be attached and removed.

(A2) Print Processing

Figure 3:
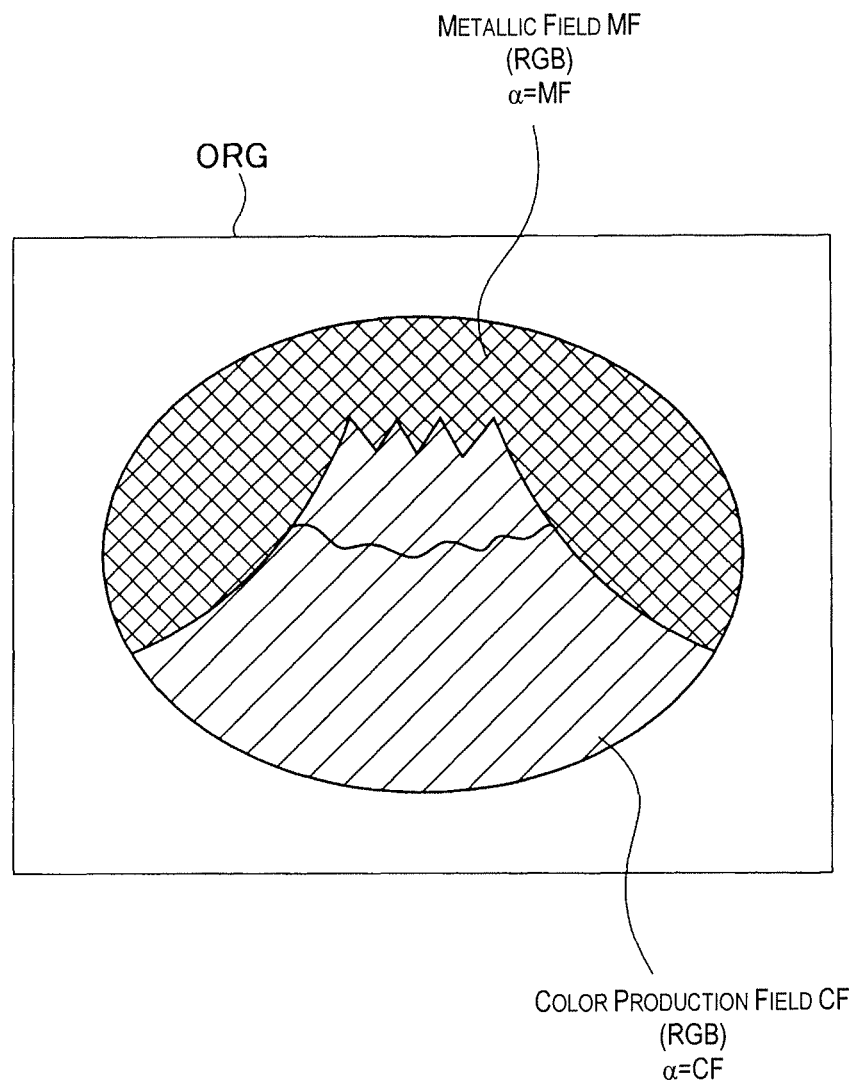
FIG. 3 is a descriptive diagram for illustrating the image data ORG.

Print processing that is carried out by the CPU 20 in the printing system 10 is described next. The image data ORG that is to be subjected to print processing will be described first. FIG. 3 is a descriptive diagram for illustrating the image data ORG corresponding to the image to be printed. The image data ORG is image data that is generated by an image production application program, as described above. The field of the image to be printed (image data ORG) includes a color production field CF which is the field that is expressed using combinations of primary and a metallic field MF which is a field that is expressed using metallic gloss in addition to combinations of primary colors. In the image data ORG, the respective pixel data for pixels that belong to the color production field CF are recorded as respective color component values (0 to 255) for R (red), G (green), B (blue). In addition, in the α-channel of the image data, values are recorded that represent that the stated pixel is a pixel that belongs to the color production field CF. The data shown on the α-channel for pixel data that belongs to the color production field CF is represented below as α=CF.

The respective pixel data for pixels belonging to the metallic field MF are also recorded as respective color component values (0 to 255) for R, G, and B. In addition, also recorded in the α-channel of the pixel data are values that express that the stated pixel is a pixel that belongs to the metallic field MF. The data shown on the α-channel for pixel data that belongs to the color production field MF is represented below as α=MF. The CPU 20 carries out image processing on the image data ORG described above.

Figure 4:
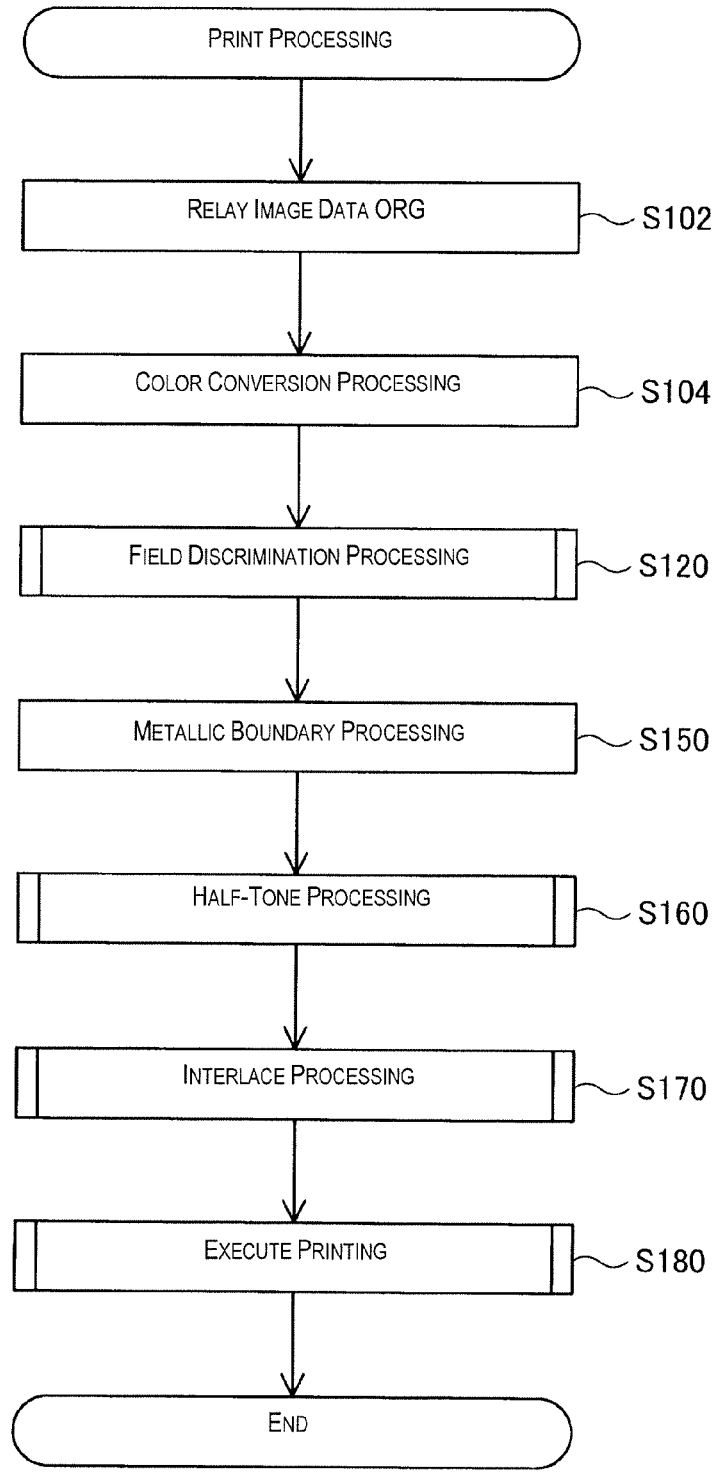
FIG. 4 is a flow chart for describing the flow of print processing.

FIG. 4 is a flow chart for describing the sequence of print processing that is carried out by the CPU 20. Print processing is initiated when the user designates print on the application program 30. When print processing is initiated, the CPU 20 relays the image data ORG to the printer driver 50 as the application program 30 (step S102). Subsequently, as a function of the color conversion module 51, the CPU 20 carries out color conversion processing that converts the respective color component values for R, G, and B recorded in the pixel data of the image data ORG into ink quantity sets which are combinations of ink quantities for the ink colors C, M, Y, K, Lc, Lm, and Mt provided by the printer 200 (step S104).

Color conversion processing is described below. Color conversion processing is carried out by the CPU 20 using the C-LUT 63 and the Mt-LUT 64. The CPU 20 reads the α-channel of the pixel data to carry out color conversion, and when α=CF, specifically, when the stated pixel is a pixel that belongs to the color production field CF, then one group of color component values (R, G, B) of the pixel data is converted to one group of ink volume sets (C, M, Y, K, Lc, Lm) using the C-LUT 63. Specifically, the C-LUT 63 is a three-dimensional lookup table in which a single group of ink volume sets (C, M, Y, K, Lc, Lm) is stored at a lattice point that is defined by one group of color component values (R, G, B).

On the other hand, when the α-channel of the pixel data that has been subjected to color conversion is read, and α=MF, specifically, when the stated pixel is a pixel that belongs to the metallic field MF, then the CPU 20 uses the Mt-LUT 64 and converts the group of color component values (R, G, B) of the pixel data into one group of ink volume sets (C, M, Y, K, Mt). Specifically, the Mt-LUT 64 is a three-dimensional lookup table that stores a group of ink volume sets (C, M, Y, K, Mt) at lattice points that are defined by a group of color component values (R, G, B). The characteristics of each LUT are described below.

Figure 5C:
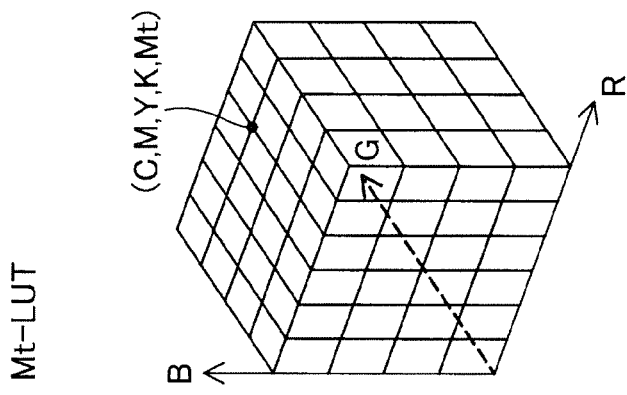
FIG. 5 is a descriptive diagram for illustrating C-LUT and Mt-LUT.
Figure 5B:
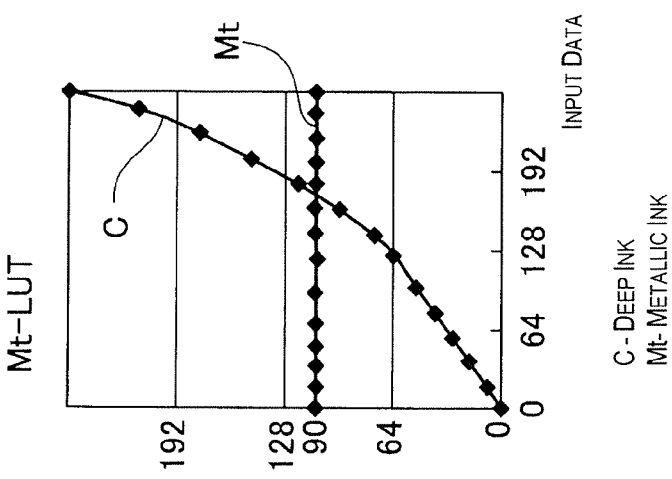
Figure 5A:
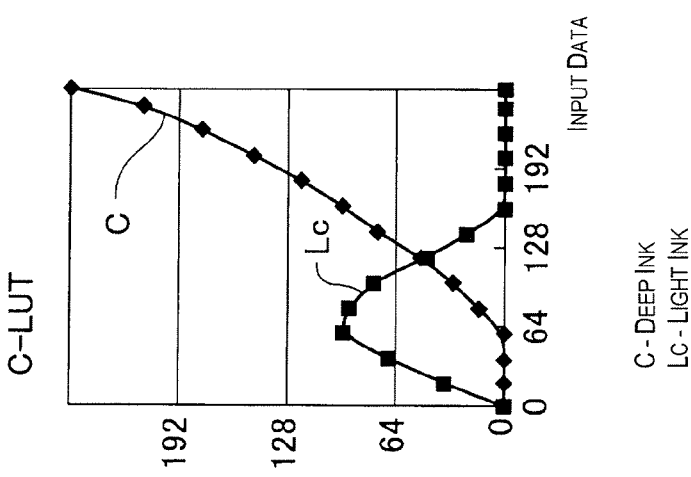

FIG. 5A is a descriptive diagram concerning the properties of the C-LUT 63 and uses a specific example to describe the ink volumes of cyan (C) and light cyan (Lc) among the inks C, M, Y, K, Lc, and Lm. As shown in FIG. 5A the C-LUT 63 defines an ink volume set using, in conjunction, deep inks (cyan (C) in FIG. 5A), and light inks (light cyan (Lc) in FIG. 5A). For this reason, when pixel data of the image data ORG belonging to the color production field CF (RGB, α=CF) has been input, by referencing the C-LUT 63, the data is converted into an ink volume set in which light inks (Lc, Lm) have been added to the deep inks (CMYK).

FIG. 5B is a descriptive diagram that describes the properties of the Mt-LUT 64. FIG. 5(C) is a conceptual diagram of the Mt-LUT 64. The Mt-LUT 64, as shown in FIGS. 5B and 5(C), defines an ink volume set only for deep inks (CMYK) among the colored inks, and defines a global value (e.g., 90) irrespective of the gray scale value of RGB for the ink volume of metallic ink. For this reason, when pixel data of the image data ORG belonging to the metallic field MF (RGB, α=MF) has been input, Mt-LUT 64 is referenced, and the data is thereby converted to ink volumes for deep inks (CMYK), whereas the metallic ink (Mt) is converted to the same ink volume.

In addition, when the color component values in the RGB system are the same for the C-LUT 63 and the Mt-LUT 64, the total ink volume for the colored ink subsequent to conversion by the respective LUTs is set so that the volume from the Mt-LUT 64 is smaller. This is based on the knowledge that color production can be achieved using a smaller ink volume of colored ink in the metallic field in comparison to the color production field. In addition, because there are limitations on the maximum ink volume that can be discharged per unit surface area of printing medium, the content image fields in which colored ink and metallic ink are to be discharged must have a defined ink volume for the colored ink that takes into consideration the ink volume of the metallic ink.

Using the C-LUT 63 and Mt-LUT 64 described above, the CPU 20 converts the image data ORG into ink volume data in which the ink volume set has been recorded for the data of each pixel. In addition, when color conversion has been carried out, the color component values in the data of each pixel are converted to an ink volume set, but the α-channel data is maintained in the state in which it was recorded, without being erased. In the description below, for purposes of convenience, the image data ORG prior to the color conversion processing is denoted by "image data ORG (0)," and the image data ORG in the form of ink volume data subsequent to color conversion processing is denoted by "image data ORG (1)."

After completion of the color conversion processing (step S104) shown in FIG. 4, the CPU 20 then carries out field discrimination processing (step S120) and metallic boundary processing (step S150) on the image data ORG (1). Field discrimination processing and metallic boundary processing are described in detail below. Subsequently, the CPU 20, as a function of the half-tone module 54, carries out half-tone processing represented by a dot distribution on the ink volume data (image data ORG (1)) after metallic boundary processing, thereby generating dot data (step S160). In this embodiment, half-tone processing is carried out by adopting a dithering method using a dither matrix. In addition, other half-tone processing methods such as error dispersion methods can be used. The dithering method and error diffusion method are well-known technologies, and descriptions are omitted.

After half-tone processing, the CPU 20, as a function of the interlace module 55, rearranges the arrangement of the dot data that has been produced to create the order in which the data is to be relayed to the printer 200, and then outputs the data as printing data to the printer 200. Along therewith, various commands such as a print start command and print end command are output to the printer 200 (step S170), and printing is carried out at the printer 200 (step S180). The above descriptions related to the sequence of print processing.

(A3) Field Discrimination Processing, Metallic Boundary Processing

Figure 6:
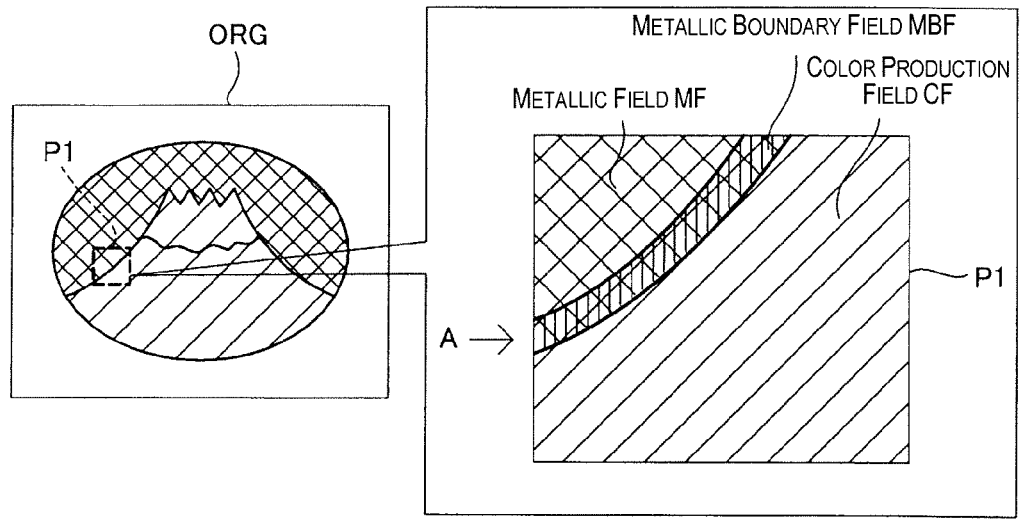
FIG. 6 is a descriptive diagram for illustrating the metallic boundary field MBF.

In describing boundary discrimination processing and metallic boundary processing, first, the metallic boundary field MBF will be described. FIG. 6 is a descriptive diagram that illustrates the metallic boundary field MBF. The metallic boundary field MBF refers to a field located towards the metallic field MF in the vicinity of a boundary that is adjacent to a metallic field MF and a color production field CF (also referred to as "metallic boundary ML" below). In the image data ORG, the metallic field MF and color production field CF are adjacent in a field P1. The metallic boundary field MBF is a field of a predetermined width that lies towards the metallic field in the vicinity of the boundary between the two adjacent fields.

With the metallic boundary ML, the metallic and colored inks are adjacent in the direction of the plane of the printing medium P in the printed image after printing. In this type of field, in order to inhibit bleeding, the CPU 20 in the printing system 10 carries out metallic boundary processing. Metallic boundary processing is described below.

Figure 7:
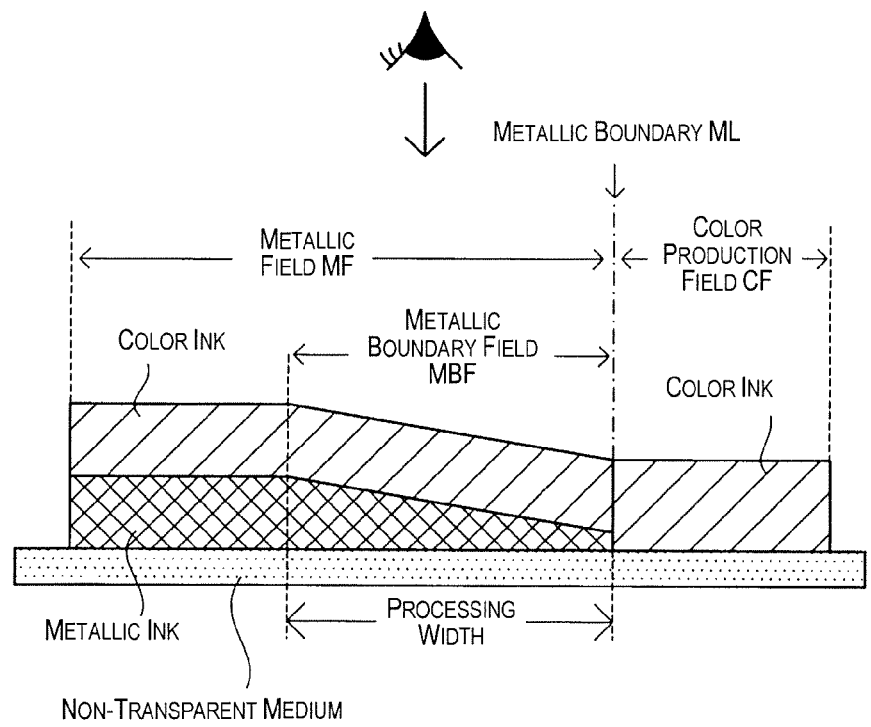
FIG. 7 is a descriptive diagram showing a schematic cross-section of the printed image.

FIG. 7 is a descriptive diagram that schematically shows a cross-section of the printed image as seen from the direction of the arrow A indicated in the field P1 of FIG. 6.

FIG. 7 shows a case in which printing is carried out using a non-transparent printing medium (e.g., standard white paper) as the printing medium. As described above (refer to the bottom left side in FIG. 2), when the printing medium is a nontransparent printing medium, the printer 200 affixes metallic ink to the printing medium first in order to form the metallic field and then applies coloring. At this time, the CPU 20 adjusts the image data ORG (1) for metallic boundary processing, thereby decreasing the ink volume of the metallic ink that is affixed to the metallic field MF as the color production field CF is approached.

As shown in FIG. 7, in the metallic field MF, the width over which the ink volume of metallic ink that is affixed to the printing medium is decreased is referred to as the processing width. In this example, the processing width can be varied over a range of 0.5 to 5 mm. In the metallic field MF, the field that is bounded by the processing width is referred to as the metallic boundary field. Field discrimination processing is the process that is carried out on all of the pixels that constitute the image data ORG (1) and discriminates the field over which the ink volume of the metallic ink is to be decreased over the predetermined processing width (metallic boundary field MBF). Field discrimination processing is described below.

Figure 8:
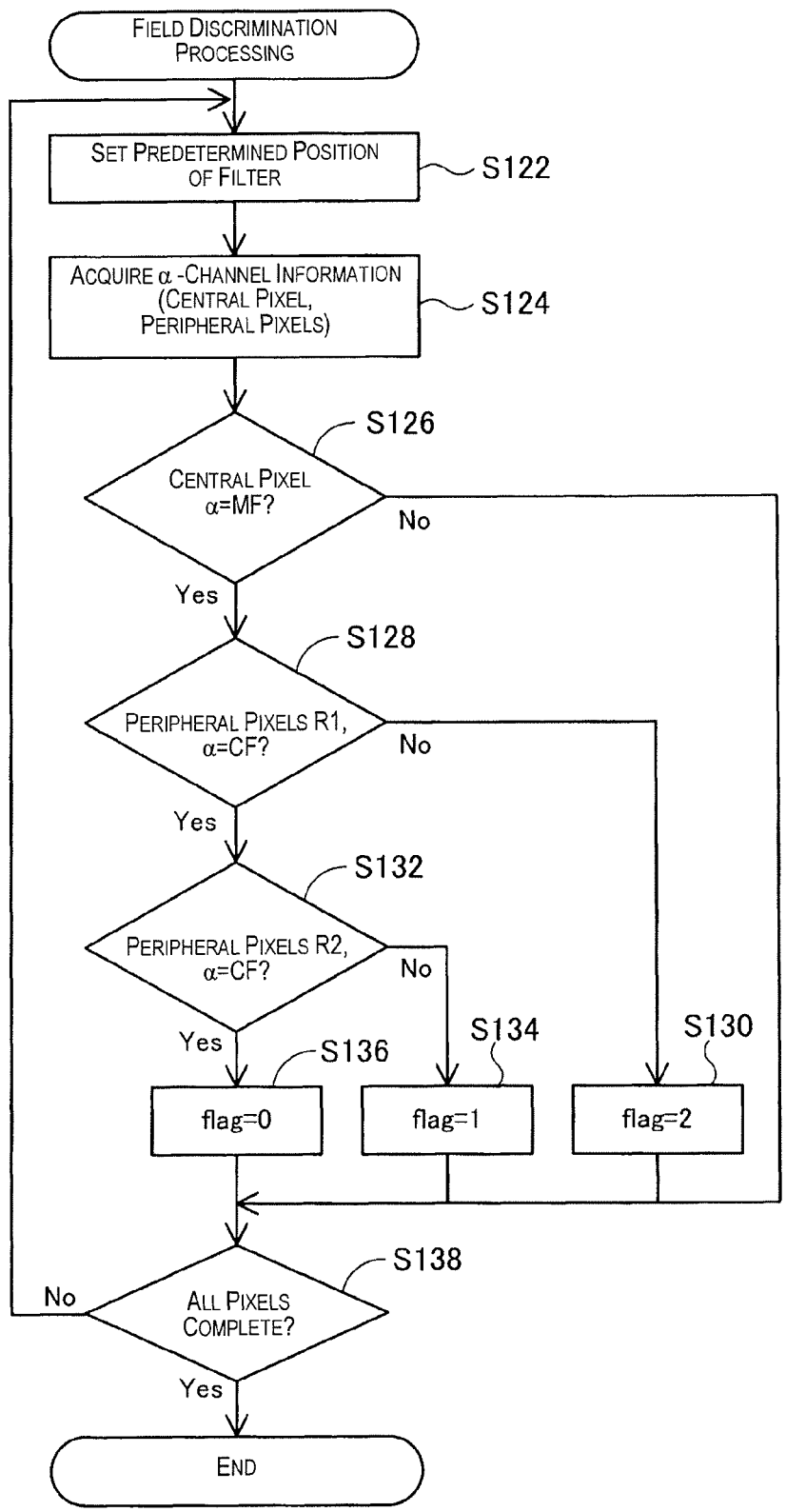
FIG. 8 is a flow chart for describing the sequence of field discrimination processing.
Figure 9:
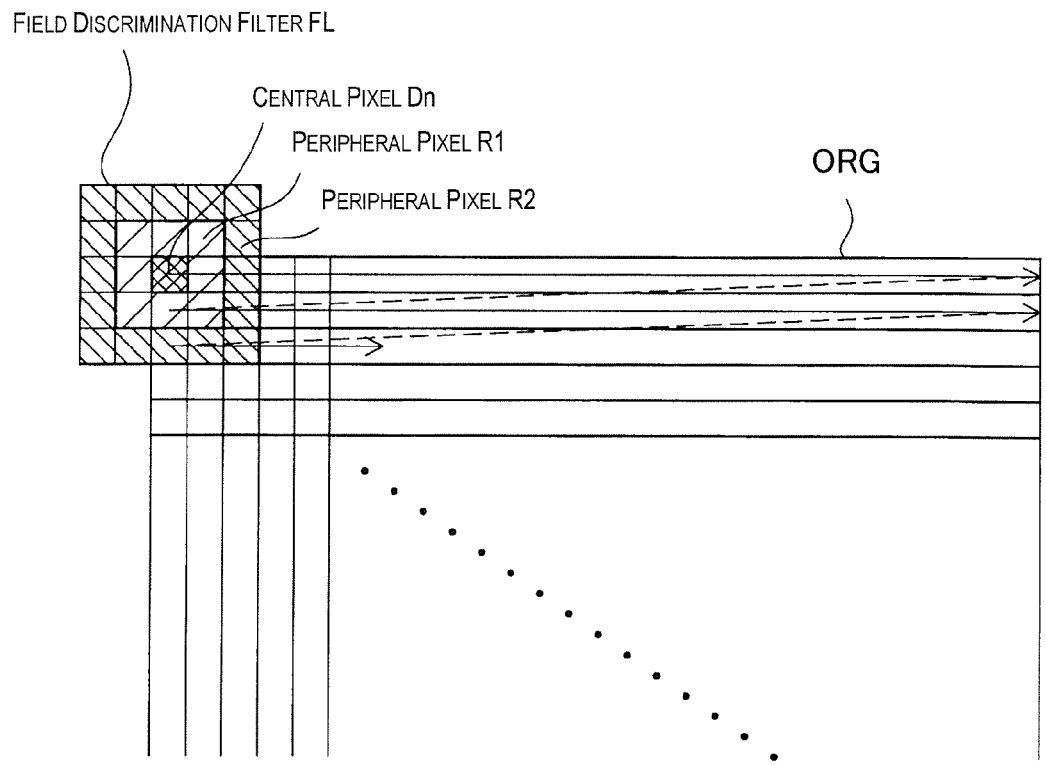
FIG. 9 is a descriptive diagram showing the state of field discrimination processing.

For purposes of convenience, a specific case is described in which metallic field processing is carried out in which the processing width is two pixels. Specifically, the ink volume of the metallic ink is decreased step-wise starting from the pixels that are two pixels away from the metallic boundary and that constitute the metallic boundary field MBF. The CPU 20 carries out field discrimination processing on the image data ORG (1) that has been subjected to color conversion processing and has been recorded as ink volume data using the image processing filter for field discrimination ("field discrimination filter FL" below). FIG. 8 is a flow chart that shows the sequence of the field discrimination processing carried out as a function of the field discrimination module by the CPU 20. In addition, FIG. 9 is a descriptive diagram showing the way that processing is carried out on the image data ORG (1) by the CPU 20 in accordance with the field discrimination filter FL. The sequence of field discrimination processing is described using FIGS. 8 and 9.

Figure 10:
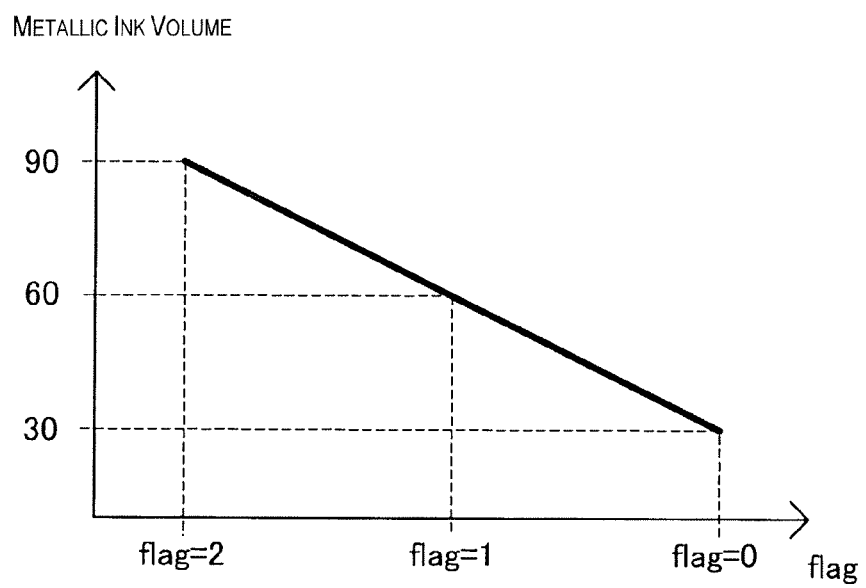
FIG. 10 is a descriptive diagram for illustrating boundary processing.

The field discrimination filter FL shown in FIG. 9 is a 5 pixel×5 pixel image processing filter. The pixel that is situated in the middle of the field discrimination filer FL is referred to as the central pixel Dn. The pixels that are situated one pixel to the outside of the central pixel Dn are referred to as peripheral pixels R1. The pixels that are situated two pixels to the outside of the central pixel Dn are referred to as peripheral pixels R2. As shown in FIG. 10, this type of field discrimination filter FL carries out field discrimination by starting from the pixel position at the upper left corner of the image data ORG (1) (initial pixel position) and moving sequentially from left to right and from top to bottom.

Upon initiation of field discrimination processing (refer to FIG. 8), the CPU 20 sets the field discrimination filter FL at the initial pixel position in the image data ORG (1) as a predetermined position (step S122). Next, the CPU 20 reads and acquires a-channel information from the image data of the image data ORG (1) that is positioned at the central pixel Dn, the peripheral pixels R1, and the peripheral pixels R2 (step S124). Next, the CPU 20 determines whether the α-channel information of the central pixel Cn in the α-channel information that has been acquired is α=MF (step S126). Specifically, it is determined whether the central pixel is a pixel that belongs to the metallic field MF. If it is not the case that α=MF in the central pixel Dn (step S126: No), then the CPU 20 advances the process to step S138.

On the other hand, if α=MF in the central pixel Dn (step S126: yes), then it is determined whether α=CF in any one of the eight peripheral pixels R1 of the field discrimination filter FL (refer to FIG. 9) (step S128). Specifically, if here are no pixels for which α=CF in any of the peripheral pixels R1 (step S128: No), then the flag is set to "2" (flag=2) in the pixel data for the central pixel Dn (step S130). Specifically, a central pixel having a flag set to "2" indicates that the pixel is located within two pixels from the metallic boundary ML.

If α=CF in any of the pixels among the peripheral pixels R1 (step S128: Yes), then the CPU 20 determines whether α=CF for any one of the pixels of the sixteen peripheral pixels R2 (refer to FIG. 9) of the field discrimination filter FL (step S170). Specifically, it is determined whether there are any pixels that belong to the color production field CF in the peripheral pixels R2. If there are no pixels for which α=CF in any of the peripheral pixels R2 (step S132: No), then the flag is set to "1" (flag=1) for the pixel data of the central pixel Dn (step S134). Specifically, a central pixel with a flag set to "1" means that the pixel is situated at the second pixel from the metallic boundary ML towards the metallic field MF.

If α=CF for any one pixel of the peripheral pixels R2 (step S132: Yes), then the CPU 20 sets the flag to "0" (flag=0) in the pixel data of the central pixel Dn (step S136). Specifically, a central pixel with a flag set to "0" means that the pixel belongs to the metallic field MF and forms the metallic field ML, and, specifically, that the pixel is in contact with the color production field CF. The process described above is carried out for all pixels of the image data ORG (1) (step S138), and the CPU 20 thus completes field discrimination processing.

After performing field discrimination processing in this manner, as a function of the boundary processing module 53, the CPU 20 carries out metallic boundary processing on the image data ORG (1) for which flags have been set. Metallic boundary processing is processing whereby the value of the ink volume of metallic ink is decreased for the pixels for which a flag has been set in field discrimination processing. FIG. 10 is a descriptive diagram that describes the metallic boundary processing that is carried out by the CPU 20. The CPU 20 scans each pixel data set of the image data ORG (1) and detects flags that have been set in field discrimination processing. For pixels having a flag set to "2" (flag=2), the ink volume of metallic ink in the ink volume set is maintained at 90, for pixels with a flag set to "1" (flag=1), the ink volume of metallic ink in the ink volume set is decreased from 90 to 60, and for pixels with a flag set to "0" (flag=0), the ink volume of metallic ink in the ink volume set is decreased from 90 to 30.

By carrying out metallic boundary processing in this manner, the ink volume of metallic ink can be decreased step-wise as the metallic boundary ML is approached in the metallic boundary field MBF of the image data ORG (1). In this example, as shown in FIG. 10, an example was described in which the ink volume of metallic ink was decreased by 30 for each pixel nearer to the metallic boundary ML in the metallic boundary field MBF, but the rate of decrease of the metallic ink can be set to increase or decrease by changing the ink volume of metallic ink associated with each flag. In addition, when the processing width is to be increased, this can be achieved by carrying out field discrimination processing with a field discrimination filter FL that is 9×9 pixels or 15×15 pixels and then carrying out metallic boundary processing in which the ink volume of metallic ink is decreased step-wise in accordance with predetermined ink volumes of metallic ink for each flag.

As described above, the CPU 20 in the printing system 10 carries out metallic boundary processing, and it is thus possible to inhibit exudation (bleeding) of ink caused by flow of metallic ink that has been affixed in the metallic field MF into the color production field CF. In this example, in metallic boundary processing, the CPU 20 decreased the ink volume of metallic ink in the metallic boundary field MBF, but degradation of image quality can be inhibited by not decreasing the ink volume of the colored ink.

When the ink volume of metallic ink is to be decreased in the metallic boundary field MBF, the ink volume of metallic ink is gradually decreased as the metallic boundary ML is approached, and it is thus possible to make it difficult to see the boundary at which the decrease in metallic ink begins in the printed image.

As was described in an example of embodiment of the invention, the user can also select the processing width of the metallic boundary processing. Specifically, in print processing (FIG. 4), after relaying the image data ORG from the application program 30 to the printer driver 50 (FIG. 4, step S102), a boundary processing method setting screen, which is used for the user to select the processing width, is displayed on the display 70 as a function of the printer driver 50.

Figure 11:
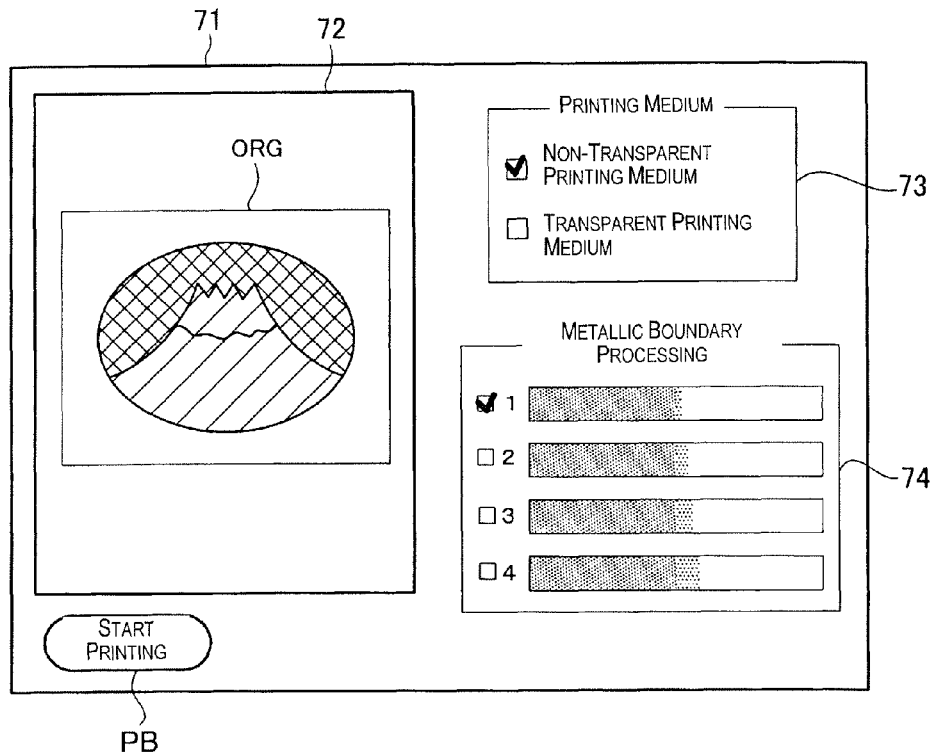
FIG. 11 is a descriptive diagram showing an example of the boundary processing method settings screen.

FIG. 11 shows an example of a boundary processing method setting screen that is displayed on the display 70. The boundary processing method setting screen 71 has a printed image display part 72 that shows the image to be printed to the user, a printing medium selection part 73 for the user to select the printing medium used for printing (non-transparent printing medium or transparent printing medium), a metallic boundary processing method selection part 74 for the user to select the processing method for the metallic boundary field MBF, and a print start button PB. This button is used for printing after the user selects the processing width for metallic boundary processing from among four selection operations. The user selects one of the process numbers assigned to the four selection operations, and the CPU 20 acquires the process number as a result of inputting a check in the metallic boundary processing method selection part 74. When the user then presses the printing start button PB, field discrimination processing and metallic boundary processing are carried out for the processing width corresponding to the acquired process number.

With the printed image that is obtained by printing subsequent to metallic boundary processing, differences will be apparent in the degree of inhibition of bleeding and the metallic glossiness of the metallic boundary field MBF, depending on the amount of decrease of metallic ink in the metallic boundary ML (also referred to as "amount of decrease of metallic ink"). The printing system 10 in this example also has a mode in which, for sample image data having a metallic boundary ML, the amount of decrease of metallic ink is made constant, and the image quality of the printed image in the metallic boundary field MBF resulting from printing at four processing widths is reproduced and presented to the user by actually printing a printed sample (color patch).

The user prints, in advance, the color patch using the printing system 10, and, by referencing the color patch, the desired processing width is selected from among the four processing widths. In this example, the image quality was altered and presented to the user as a color patch with only the processing width having been altered; however, it is possible for the image quality to be altered and presented to the user as a color patch with only the amount of decrease in metallic ink being altered, or with the processing width and the rate of decrease in metallic ink determined by the amount of decrease in metallic ink being altered.

Figure 12:
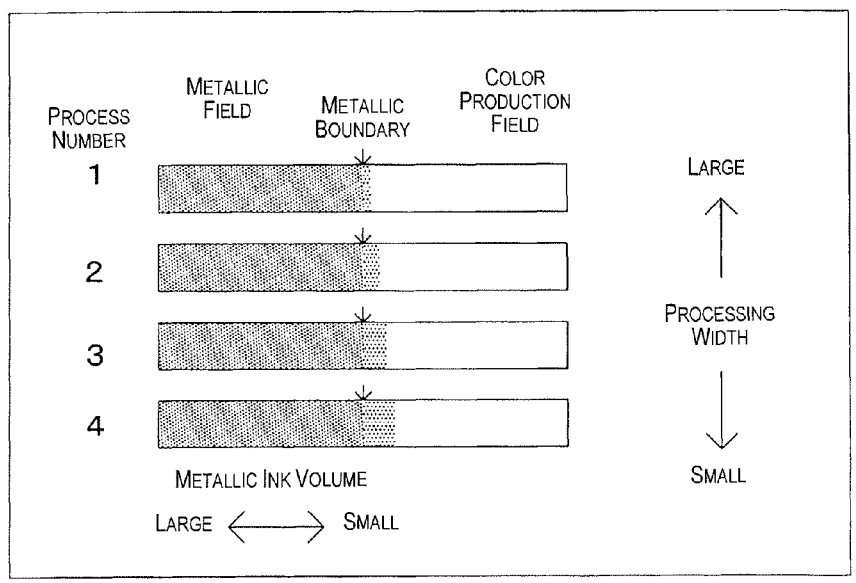
FIG. 12 is a descriptive diagram showing the color patch for metallic boundary field processing.

FIG. 12 is a descriptive diagram that describes a color patch produced using sample image data for metallic boundary processing. The CPU 20 in the printing system 10 outputs image data corresponding to the color patch to the printer 200 as a function of the color patch output module 56 (refer to FIG. 1), allowing printing on the printer 200. The metallic boundary field MBF is actually printed at the four processing widths in the color patch. In FIG. 12, a black color is increasingly brought out on the color patch as the ink volume of metallic ink that is affixed increases. By utilizing this type of mode, the printing system 10 allows the user to select the boundary processing method for the metallic boundary field MBF as a process number while viewing the color patch that has been actually printed. With this type of mode, each process number, the field discrimination filter FL that is used, and the ink volume of metallic ink associated with each flag that is set by field discrimination processing are grouped and stored in advance in the RAM 62 as tabular data (not shown in the drawings), and the data is expressed when the CPU 20 carries out field discrimination processing and metallic boundary processing by referencing the tabular data as necessary. In terms of correspondence with the claims, the boundary processing module 53 corresponds to the special gloss boundary processor in the claims.

B. Modification Example

The invention is not limited to the examples and embodiments described above, and, for example, can be worked in various modes that do not deviate from the scope of the invention. For example, the following modifications are possible.

(B1) Modification Example 1

Figure 13:
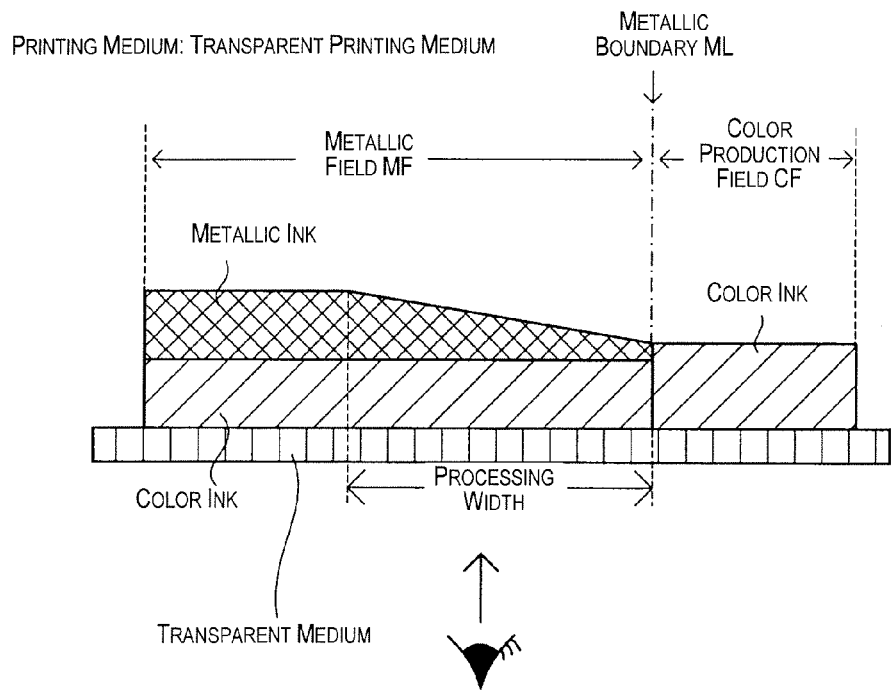
FIG. 13 is a descriptive diagram for illustrating metallic boundary region processing with a transparent printing medium.

In the examples described above, a case was described in which the printing medium was a non-transparent medium, but a transparent printing medium can also be used as the printing medium. Transparent and semi-transparent films can be cited as transparent printing media. FIG. 13 is a descriptive diagram for illustrating the metallic boundary processing carried out by the CPU 20 in the printing system 10 when printing is carried out using a transparent printing medium (e.g., transparent film) as the printing medium. When the printing medium is a transparent printing medium, the printer 200 affixes colored inks first to the printing medium and then affixes the metallic ink in order to form the metallic field MF. In this manner, a metallic appearance is reproduced on the viewing surface (side opposite from the side to which the ink is affixed). At this time, in the same manner as when the printing medium P is an non-transparent printing medium (FIG. 7), the CPU 20 adjusts the image data ORG (1) by metallic boundary processing, thereby decreasing the ink volume of metallic ink that is affixed to the metallic field MF so that the amount decreases as the color production field CF is approached. In this manner, bleeding is inhibited by making it difficult for metallic ink in the metallic boundary ML to flow out into the color production field CF. When printing is carried out on a film or the like, printing can be carried out after subjecting the film in advance to a surface treatment using an ink primer liquid or the like.

(B2) Modification Example 2

In the above examples, field discrimination processing was carried out on the ink volume data after color conversion, but this processing can also be carried out at another processing stage. For example, field discrimination can be carried out on the image data ORG subsequent to relay from the application program 30 to the printer driver 50, specifically, on the image data ORG in which the color component values of each pixel data set have been recorded in the RGB color system, thereby setting a flag for each pixel data set. Subsequently, color conversion processing can be carried out and metallic boundary processing can be carried out. Similar effects as in the example described above can be obtained in this manner.

In addition, in the example described above, the pixels belonging to the metallic field MF in the image data ORG are stipulated by the α-channel, but the ink volume of the metallic ink can be directly recorded for each pixel data set in the image data ORG. In this case, metallic boundary processing also can be carried out as a preliminary stage of color conversion processing. Because the ink volume of metallic ink has been recorded for each pixel data set prior to color conversion, field discrimination processing can be carried out at this stage, and metallic boundary processing can be carried out on the ink volumes of the metallic ink that are recorded for each pixel data set in accordance with the flags that have been set.

(B3) Modification Example 3

Figure 14:
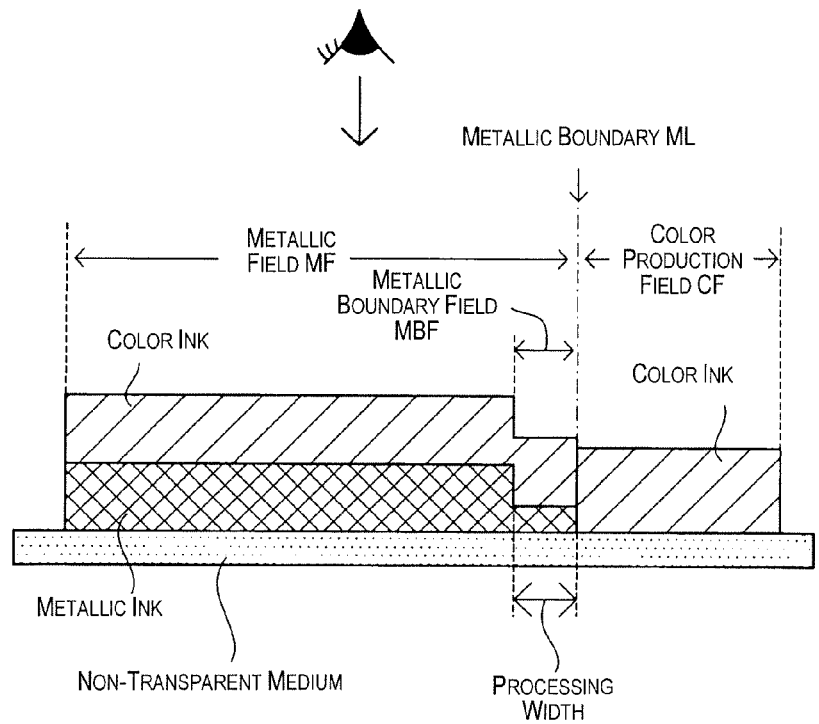
FIG. 14 is a descriptive diagram for illustrating modification example 3.

In the examples described above, the ink volume of metallic ink in the metallic boundary field MBF was smoothly decreased in metallic boundary processing as the metallic boundary ML was approached, but the invention is not limited to this description, and the ink volume of the metallic ink can be made to decrease in various manners. For example, as shown in FIG. 14, the ink volume of the metallic ink can be decreased step-wise. In addition, the ink volume of metallic ink can be decreased in two or more steps. In this manner, exudation (bleeding) due to flow of metallic ink into the color production field CF can be inhibited.

(B4) Modification Example 4

In the example described above, a metallic ink having metallic gloss was used as the special glossy ink, but special glossy inks such as white and pearlescent white inks, or clear inks that exhibit luster can be used. By using these types of special glossy inks, it is possible to express various types of textures in the printed image.

In the examples described above, the ink volume of the metallic ink alone was decreased in metallic boundary processing, but the same processing as used for metallic boundary processing can be carried with the colored inks (C, M, Y, K, Lc, Lm). In this case, a computation is carried out for proportionally decreasing the ink volume of each ink color, thereby decreasing the ink volumes. For example, by increasing the rate of decrease of the ink volumes of each ink color as the metallic boundary ML is approached in the metallic boundary field MBF, the ink volumes can be decreased in a step-wise manner, and bleeding can be inhibited in this manner as well.

Embodiments of the invention were described above, but the invention is not limited by these embodiments and can be worked in various modes that do not deviate from the scope of the invention. For example, the invention is not limited to the serial-format ink jet printer that was described in the above embodiments, but can also be utilized in ink jet-format line printers or laser printers provided with toners having special glossy colors. In addition to printing system configurations, the invention can also be worked in the form of an image processing device, a printing device, a printing method, a program, a storage medium, and the like.

The entire disclosure of Japanese Patent Application No. 2011-091655, filed Apr. 18, 2011 is expressly incorporated by reference herein.

What is claimed is:

1. An image processing device for outputting printing image data for printing to a printing device for carrying out printing using a colored ink, and a special glossy ink having special gloss, the image processing device comprising:
    an input part configured to input image data of an image to be printed;
    a field discrimination part configured to discriminate, based on the image data, whether there is an adjacent field, in which a special glossy field that is expressed in the image data using the special glossy ink and a color production field that is expressed in the image data using only the colored ink are adjacent with respect to each other in a first direction of an image plane;
    a special gloss boundary processor configured to adjust the image data of the adjacent field so that an ink volume of the special glossy ink affixed to the special glossy field is gradually reduced as the special glossy field approaches the color production field in a second direction perpendicular to the first direction, in a case where the adjacent field is present; and
    an output part configured to output the printing image data based on the adjusted image data to the printing device.

2. The image processing device according to claim 1, wherein
    the special gloss boundary processor, by adjusting the input image data, does not change the ink volume of the colored ink that is affixed by the printing device based on the printing image data.

3. The image processing device according to claim 1, wherein
    the special gloss boundary processor sets, within a predetermined range, the rate of decrease in the gradually decreasing special glossy ink.

4. The image processing device according to claim 3, further comprising
    a color patch output part causing the printing device to print a color patch that associates, for predetermined image data having the adjacent field, a plurality of the rates of decrease with images of individual adjacent fields based on the adjusted respective image data sets at each of the rates of decrease.

5. The printing processing device according to claim 1, wherein
    the special glossy ink is a metallic ink having metallic gloss.

6. A printing device whereby printing is carried out using a colored ink and a special glossy ink having special gloss, the printing device further comprising:

an input part configured to input image data representing an image to be printed;

a field discrimination part configured to discriminate, based on the image data, whether there is an adjacent field, in which a special glossy field that is expressed in the image data using the special glossy ink and a color production field that is expressed in the image data using only the colored ink are adjacent with respect to each other in a first direction of an image plane;

a special gloss boundary processor configured to adjust the image data of the adjacent field so that an ink volume of the special glossy ink affixed to the special glossy field is gradually reduced as the special glossy field approaches the color production field in a second direction perpendicular to the first direction, in a case where the adjacent field is present; and a printing part configured to execute printing based on the adjusted image data.

7. A medium having recorded thereon an image processing program for outputting printing image data for printing to a printing device for carrying out printing using a colored ink and a special glossy ink having special gloss, the medium being a computer-readable medium having recorded thereon an image processing program that causes the computer to execute:

a function configured to input image data representing an image to be printed;

a function configured to discriminate, based on the image data, whether there is an adjacent field, in which a special glossy field that is expressed in the image data using the special glossy ink and a color production field that is expressed in the image data using only the colored ink are adjacent with respect to each other in a first direction of an image plane;

a function configured to adjust the image data of the adjacent field so that an ink volume of the special glossy ink affixed to the special glossy field is gradually reduced as the special glossy field approaches the color production field in a second direction perpendicular to the first direction, in a case where the adjacent field is present; and a function configured to output the printing image data based on the adjusted image data to the printing device.

8. The image processing device according to claim 1, wherein
the adjacent field is a field that is located at a side of the special glossy field relative to a boundary between the special glossy field and the color production field in the second direction, and extends a predetermined width from the boundary in the second direction.

9. The image processing device according to claim 2, wherein
the special gloss boundary processor does not change the ink volume of the colored ink in the adjacent field while the ink volume of the special glossy ink affixed to the special glossy field is gradually reduced in the second direction.

\* \* \* \* \*